United States Patent
Danilov et al.

(10) Patent No.: US 10,318,191 B1
(45) Date of Patent: Jun. 11, 2019

(54) MIGRATION AND TRANSFORMATION OF DATA STORAGE IN A REPLICATED ENVIRONMENT

(71) Applicant: EMC IP Holding Company LLC, Hopkinton, MA (US)

(72) Inventors: Mikhail Danilov, Saint Petersburg (RU); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/653,052

(22) Filed: Jul. 18, 2017

(51) Int. Cl.
  *G06F 12/00* (2006.01)
  *G06F 3/06* (2006.01)
  *G06F 13/00* (2006.01)
  *G06F 13/28* (2006.01)

(52) U.S. Cl.
  CPC ............ *G06F 3/0619* (2013.01); *G06F 3/065* (2013.01); *G06F 3/067* (2013.01); *G06F 3/0647* (2013.01)

(58) Field of Classification Search
  CPC ........ G06F 3/0619; G06F 3/065; G06F 3/067; G06F 3/0647
  See application file for complete search history.

(56) References Cited

U.S. PATENT DOCUMENTS

| | | | | |
|---|---|---|---|---|
| 5,680,640 A | * | 10/1997 | Ofek | G06F 3/0607 710/19 |
| 6,058,054 A | * | 5/2000 | Islam | G06F 11/1435 365/200 |
| 7,085,883 B1 | * | 8/2006 | Dalgic | G06F 3/0617 711/114 |
| 2003/0140051 A1 | * | 7/2003 | Fujiwara | H04L 67/1097 |
| 2012/0179779 A1 | * | 7/2012 | Awasthi | H04L 67/1097 709/217 |
| 2013/0080723 A1 | * | 3/2013 | Sawa | G06F 3/0607 711/162 |

* cited by examiner

*Primary Examiner* — Mark A Giardino, Jr.
(74) *Attorney, Agent, or Firm* — Amin, Turocy & Watson, LLP

(57) ABSTRACT

Facilitating parallel migration and transformation of data storage in a replicated environment is provided herein. A method can comprise determining, by a system comprising a processor, that first data of a first storage device and second data of a second storage device are scheduled to be migrated to a third storage device and a fourth storage device in a replicated storage environment. The method can also comprise mapping, by the system, the third storage device to the first storage device, and the fourth storage device to the second storage device. Further, the method can comprise facilitating, by the system, a parallel migration/transformation of the first data to the third storage device and the second data to the fourth storage device.

20 Claims, 10 Drawing Sheets

MIGRATION AND TRANSFORMATION OF DATA STORAGE IN A REPLICATED ENVIRONMENT

TECHNICAL FIELD

The subject disclosure relates generally to data storage. More specifically, this disclosure relates to migration and transformation of storage in a replicated environment.

BACKGROUND

Distributed storage systems and/or object storage systems can provide a wide range of storage services while achieving high scalability, availability, and serviceability. An example of such storage systems is referred to as Elastic Cloud Storage (ECS), which uses the latest trends in software architecture and development to achieve the above noted services, as well as other services.

Elastic cloud storage can implement multiple storage Application Programming Interfaces (APIs), which can include a Content-Addressable Storage (CAS) platform for data archiving, a web service that provides storage through web service interfaces, as well as others. Entities with applications that use the APIs supported can benefit from switching to elastic cloud storage. Thus, solutions to transform and migrate legacy data stored in existing standalone storage within elastic cloud storage can be beneficial.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments relate to a method that can comprise determining, by a system comprising a processor, that first data of a first storage device and second data of a second storage device are scheduled to be migrated to a third storage device and a fourth storage device in a replicated storage environment. The method can also comprise mapping, by the system, the third storage device to the first storage device, and the fourth storage device to the second storage device. Further, the method can comprise facilitating, by the system, a parallel or concurrent migration of the first data to the third storage device and the second data to the fourth storage device.

Another embodiment relates to a system comprising a processor and a memory that stores executable instructions that, when executed by the processor, facilitate performance of operations. The operations can comprise initiating a transformation of data from a first group of data storage devices to a second group of data storage devices. A first data replication can be established between first data storage devices in the first group of data storage devices. A second data replication can be established between second data storage devices in the second group of data storage devices. The operations can also comprise mapping the first data storage devices in the first group of data storage devices to the second data storage devices in the second group of data storage devices. Further, the operations can comprise facilitating a parallel transformation of data from the first group of data storage devices to the second group of data storage devices.

A further embodiment relates to a computer-readable storage medium comprising instructions that, in response to execution, cause a system comprising a processor to perform operations. The operations can comprise mapping a first device to a second device based on a first determination that first data contained in the first device is to be migrated to the second device and mapping a third device to a fourth device based on a second determination that second data contained in the third device is to be migrated to the fourth device. The operations can also comprise facilitating a first migration of the first data from the first device to the second device and facilitating a second migration of the second data from the third device to the fourth device. The first migration and the second migration can be performed concurrently.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
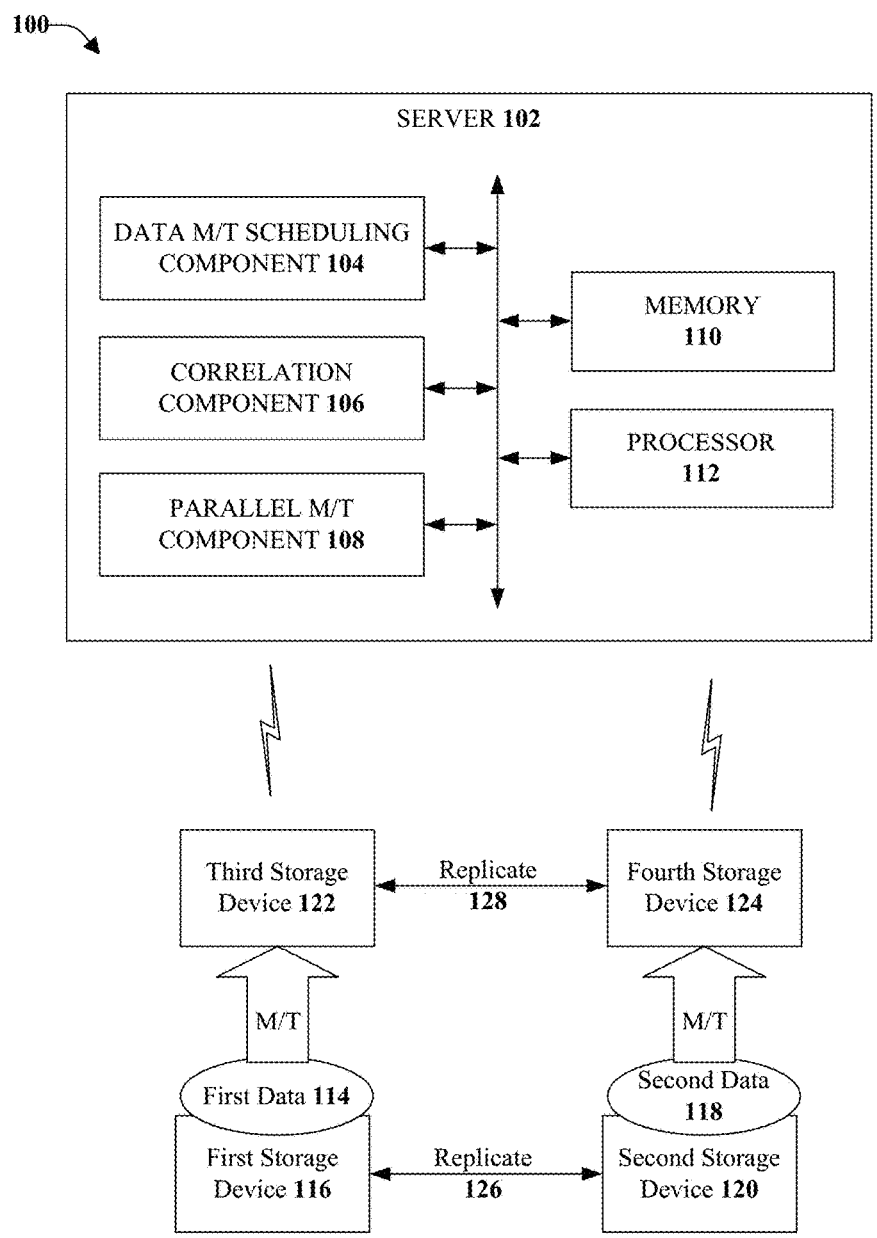
FIG. 1 illustrates an example, non-limiting, system for migration and transformation of data storage in a replicated environment in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Discussed herein are various aspects that can relate to facilitating parallel storage migration/transformation in which both old storage devices and new storage devices take an active part. Accordingly, the overall throughput of storage migration/transformation can be increased since the process can be driven in parallel by two pairs of storage devices. In addition, data clients associated with different storage devices can have similar latencies for reads through (e.g., bypassing a new storage device to obtain data from an old storage device). Load balance can be shared between the new storage devices during storage migration/transformation. In some aspects, a hash function can be utilized such that reads of legacy data can be shared almost equally between the new storage devices. Further, the new storage devices can synchronize object lists during the storage migration/transformation and, thus, the process can be started sooner and without a disruption of service. In addition, the disclosed aspects facilitate synchronization of object lists to assist with the storage migration/transformation of legacy data from the old storage devices.

As used herein, the term "storage system" can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with on another to provide resources for end-users.

Further, the term "storage device" can refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

FIG. 1 illustrates an example, non-limiting, system 100 for migration and transformation of data storage in a replicated environment in accordance with one or more embodiments described herein. From the perspective of the various embodiments provided herein, there is no difference between migration and transformation and, therefore, the terms migration, transformation, migration/transformation, or the notation M/T, can be utilized herein to refer any of the processes. The system 100 can facilitate active participation by the storage devices being affected during the migration/transformation of the data storage. Thus, both existing storage devices and replacement storage devices participate in the storage migration/transformation.

The system 100 can include a server device 102 that can perform storage migration/transformation as discussed herein. The server device 102 can include a storage migration/transformation scheduling component 104, a correlation component 106, a parallel migration/transformation component 108, at least one memory 110, and at least one processor 112.

The storage migration/transformation scheduling component 104 can determine that first data 114 of a first storage device 116 and second data 118 of a second storage device 120 are scheduled to be migrated (or transformed) to a third storage device 122 and a fourth storage device 124 in a replicated storage environment.

In some cases, the storage devices can be included in respective storage nodes, which can include one or more services and/or one or more storage devices. In some embodiments, a storage node can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage nodes. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tolls, and/or testing systems.

In accordance with some implementations, the storage migration/transformation scheduling component 104 can create and configure the migration/transformation of data. The correlation component 106 can cross-reference or map the new storage to a corresponding old storage from the same location. For example, the correlation component 106 can map the third storage device 122 to the first storage device 116, and the fourth storage device 124 to the second storage device 120.

The replicated storage environment can be an environment where two or more storage devices are connected with replication. For example, the first storage device 116 and the second storage device 120 can be connected with a first replication 126. Further, the third storage device 122 and the fourth storage device 124 can be connected with a second replication 128. Bi-directional replication between two storages has been shown and described herein as an example. However, it is noted that the aspects disclosed herein can be applied to other replication topologies.

The first storage device 116 can be an exiting storage device associated with a first entity and the second storage device 120 can be an existing storage device associated with a second entity. The third storage device 122 can be a new storage device for the first entity and can replace the first storage device 116. The fourth storage device 124 can be a new storage device for the second entity and can replace the second storage device 120. As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or ore more customers, one or more humans, and so forth, hereinafter referred to as an entity or entities depending on the context.

Further, the parallel migration/transformation component 108 can facilitate a parallel migration/transformation of the first data 114 to the third storage device 122 and the second data 118 to the fourth storage device 124. According to some implementations, the parallel migration/transformation component 108 can facilitate, during the parallel migration/transformation, read through functionality by the new storage devices using the respective old storage devices to which the new storage devices are mapped. For example, the third storage device 122 can provide read through functionality using the first storage device 116 and the fourth storage device 124 can provide read through functionality using the second storage device 120.

Thus, in an example, the parallel migration/transformation component 108 can facilitate, during the parallel migration/transformation, reading of the first data 114 from the first storage device 116 in response to a request for the first data 114. Reading the first data 114 can comprise reading the first data via the third storage device 122. In another example, the parallel migration/transformation component 108 can facilitate, during the parallel migration/transformation, reading of the second data 118 from the second storage device 120 in response to another request for the second data 118. Further to this example, reading the second data 118 can comprise reading the second data 118 via the fourth storage device 124.

Additionally or alternatively, the parallel migration/transformation component 108 can facilitate the handling of all new requests (e.g., new writes and reads of new data). For example, the parallel migration/transformation component 108 (or another system component) can receive a first write request from a first client device (associated with the first storage device 116) and can instruct the first write request to be processed by the third storage device 122. The first write request can for data not previously received (e.g., not stored at the first storage device 116). Further, the first storage device 116 is not accessed during a time period when the first write request is being processed. A similar process can be performed for a second write request received from a second entity associated with the second storage device 120, where the second write request is processed by the fourth storage device 124 without accessing the second storage device 120.

In another example, the parallel migration/transformation component 108 (or another system component) can receive a first read request from the first client device and can instruct the first read request to be processed by the third storage device 122. The first read request can be for reading of new data not previously stored. Further, the first storage device 116 is not accessed during a time period when the first read request is being processed. A similar process can be performed for a second read request received from a second entity associated with the second storage device 120, where the second read request is processed by the fourth storage device 124 without accessing the second storage device 120.

As discussed herein, the new storages (e.g., the third storage device 122 and the fourth storage device 124) drive the migration/transformation. Further, since the devices are in the replicated environment, the content of the old storages (e.g., the first data 114 and the second data 118) can be nearly identical, the scope of the migration/transformation can be divided between the new storages. According to some implementations, dividing the data can be performed utilizing a hash function. A hash function is any function that can be used to map data of arbitrary size to data of a fixed size, for example. The hash function can be applied to an object ID to find a primary location (e.g., a new storage) for the object. The new storage devices can manage the respective objects assigned to the new storage devices with the hash function. For example, during a migration phase (if any), a new storage reads content of the objects assigned to it from the old storage to which it is mapped. According to some implementations, the hash function can be utilized to one data set (e.g., the first data 114, the second data 118) into multiple subsets and the new storages can control respective subsets of the data.

The results of the migration/transformation can be shared between the third storage device 122 and the fourth storage device 124 via a replication mechanism (e.g., the second replication 128) configured between the third storage device 122 and the fourth storage device 124.

According to some implementations, the new storage devices can enumerate respective content of the old storage device to which it is mapped. Thus, the new storage devices can receive respective lists (or a complete list) of legacy objects. The list can also contain objects assigned to another new storage device. Further, the list of objects found can be synchronized between the new storages such that legacy objects that exist only in one old storage device are not overlooked.

For example, the third storage device 122 can receive a list of legacy objects contained in the first storage device 116 and can also receive a list of objects assigned to the fourth storage device 124. In another example, the fourth storage device 124 can receive a list of legacy objects contained in the second storage device 120 and can also receive a list of objects assigned to the third storage device 122.

With continuing reference to the server device 102, the at least one memory 110 can be operatively coupled to the at least one processor 112. The at least one memory 110 can store protocols associated with facilitating storage migration/transformation in a replicated environment as discussed herein. Further, the at least one memory 110 can facilitate action to control communication between the server device 102 and the one or more storage devices, such that the system 100 can employ stored protocols and/or algorithms to achieve improved storage migration/transformation as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 112 can facilitate processing data related to parallel migration/transformation as discussed herein. The at least one processor 112 can be a processor dedicated to analyzing and/or generating information received, a processor that controls one or more components of the system 100, and/or a processor that both analyzes and generates information received and controls one or more components of the system 100.

Figure 2:
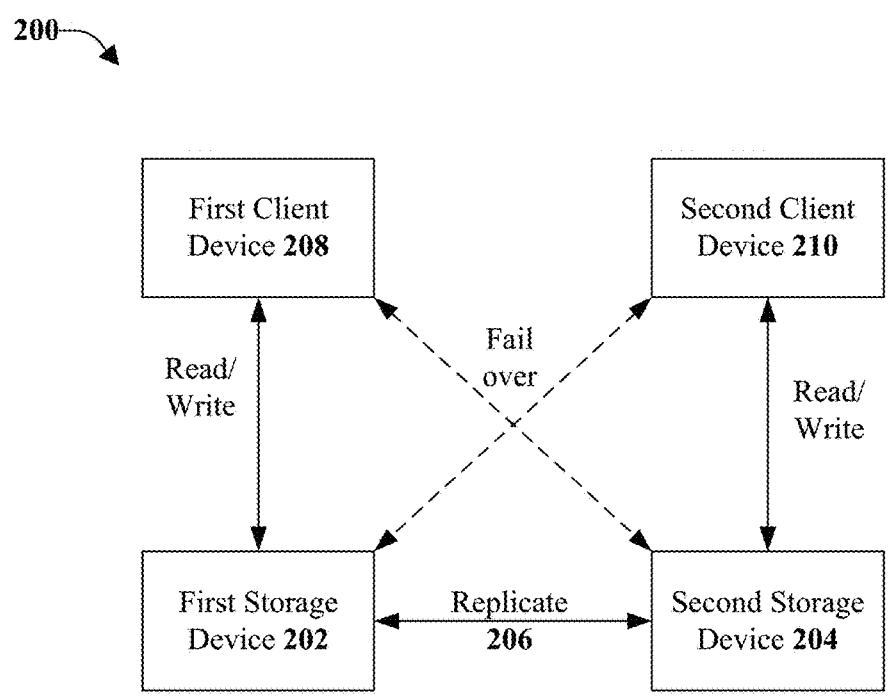
FIG. 2 illustrates an example system that facilitates bi-directional replication without the use of the aspects disclosed herein.

To further describe the disclosed aspects, FIG. 2 illustrates an example system 200 that facilitates bi-directional replication without the use of the aspects disclosed herein. Elastic Cloud Storage (ECS) can offer a wide range of data storages. The new storages can support one or several existing data storage APIs (content addressed storage API, various cloud storage services various web services, and so on) and can provide new value-added services. These services can allow implementation of a new range of solutions for various entities (e.g., users). In addition, entities can request that the new solutions to be applied to all their data, including existing data stored in other storages (e.g., non-ECS). This can be achieved through storage migration and/or storage transformation. Storage migration is an approach that implies physical storage migration from an old storage to new storage. Storage transformation relates to when a new storage is a primary storage that operates as a proxy for an old storage. All the objects in the transformed system, regardless of their physical location, are equal from the application and value-added services of the new storage point of view. Further details related to storage transformation are provided below with respect to FIG. 6.

ECS can have a built-in service that drives the process of storage migration and transformation. However, the M/T methods can support M/T of a standalone storage only. Meanwhile, enterprises rarely use standalone storages. Storages normally operate in a replicated environment. In other words, two or more storages are connected with replication. FIG. 2 illustrates an example, non-limiting, system 200 that facilitates bi-directional replication between two storages.

As illustrated, there are two active locations comprise respective storages, namely a first storage device 202 and a second storage device 204. The first storage device 202 and the second storage device 204 can be connected with bi-directional replication 206. A client at the respective locations can mainly use its local storage. For example, a first client device 208 can use the first storage device 202 and a second client device 210 can use the second storage device 204. A remote storage can be used for failover. For example, during a failover event, the first client device 208 can use the second storage device 204, since the second storage device 204 has replicated the data contained in the first storage device 202. In another example, during a failover, the second client device 210 can use the first storage device 202, since the first storage device 202 has replicated the data contained in the second storage device 204.

Figure 3:
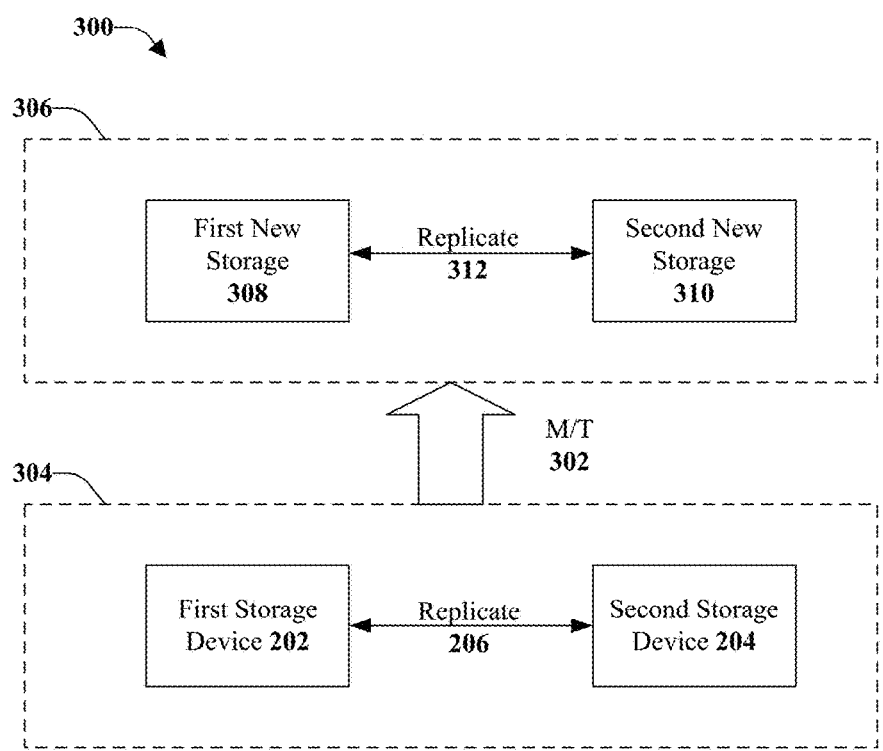
FIG. 3 illustrates an example, non-limiting, system for performing the task of migration/transformation in a replicated environment without the use of the disclosed aspects.

When M/T is needed in a replicated environment, the old environment can be repeated with new storage. FIG. 3, illustrates an example, non-limiting, system 300 for performing the task of migration/transformation in a replicated environment without the use of the disclosed aspects. Repetitive description of like elements employed in other embodiments described herein is omitted for sake of brevity.

In further, detail when M/T 302 is to occur in a replicated environment, the old environment 304, represented by the dashed box (e.g., the environment of FIG. 2) can be repeated with new storages in a new environment 306, represented by the dashed box. Thus, the first storage device 202 and the second storage device 204 can be replaced with a first new storage device 308 and a second new storage device 310. The first new storage device 308 and the second new storage device 310 can be connected with bi-directional replication 312.

After the M/T 302 is completed, the storage clients can use the first new storage device 308 and the second new storage device 310 in place of the first storage device 202 and the second storage device 204. In cases where the M/T does not support a replicated environment, the M/T is performed as if there is only one old storage device. In other words, the fact of replication is simply ignored. For the task illustrated in FIG. 3, this means that one new storage (e.g., the first new storage device 308) performs M/T for a collocated old storage (e.g., the first storage device 202 for the first new storage device 308). Then the new storage (e.g., the first new storage device 308) uses replication to copy all the data to another new storage (e.g., the second new storage device 310). This means that in the example of FIG. 3, the second storage device 204 is ignored and the second new storage device 310 is passive.

Figure 4:
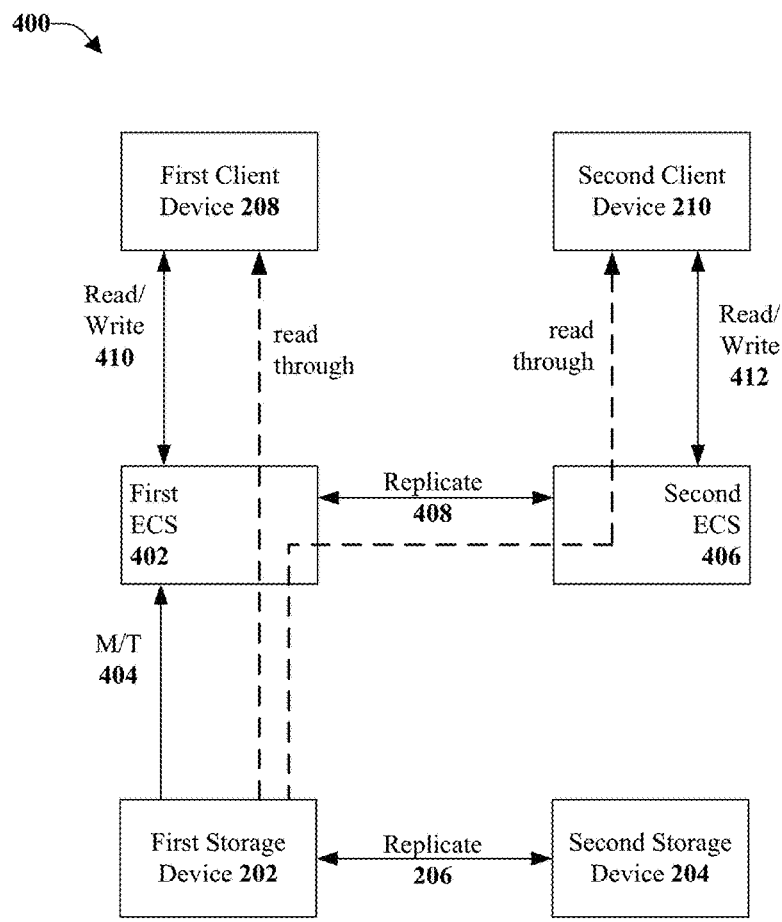
FIG. 4 illustrates an example system for migration/transformation with elastic cloud storage without use of the disclosed aspects.

FIG. 4 illustrates an example system 400 for migration/transformation with elastic cloud storage without use of the disclosed aspects. It is noted that ECS can support coexistence of old and new storages during M/T (e.g., allows "seamless" M/T). Repetitive description of like elements employed in other embodiments described herein is omitted for sake of brevity.

In FIG. 4, a first new storage device (e.g., first ECS 402) can be a new storage that drives M/T 404. The first ECS 402 enumerates content of old storage (e.g., the first storage device 202) in order to perform transformation. If migration is also needed, the first ECS 402 uses the list of objects in the first storage device 202 to copy actual data to the first ECS 402. The enumeration results and (optional) legacy data can be copied to a second ECS 406 via a standard replication mechanism 408.

All new writes and reads 410 of new data from the first client device 208 can be handled by the first ECS 402. All new writes and reads 412 of new data from the second client device 210 can be handled by the second ECS 406. A read through feature is used to derive legacy data that has not been migrated to ECS (e.g., is in the process of being migrated). All the reads through are handled by the new storage, which drives M/T, which is the first ECS 402 in the example of FIG. 4.

With the M/T 404 of FIG. 4, the second client device 210 can experience much higher latencies for reads through, since the read through has to be processed by the first ECS 402. For example, there is a chain of three storages (e.g., the second ECS 406, the first ECS 402, and the first storage device 202). Further, the first ECS 402 and the first storage device 202 are remote from the second client device 210, adding to the latency.

In addition, the M/T 404 of FIG. 4 has a low overall throughput. For example, the second ECS 406 is not used for the M/T 404 (e.g., is passive). Therefore, the second ECS 406 does not increase the speed of the M/T 404.

In addition, there is an inadequate load balance between the first ECS 402 and the second ECS 406 during the M/T 404. As illustrated, the first ECS 402 can have a higher load because the first ECS 402 handles its client I/O (e.g., the first client device 208) and performs M/T 404 concurrently.

Another challenge can be that there is primary location for data in ECS. All data reads are forwarded to its primary ECS cluster. Therefore, after M/T 404 is over, all reads of legacy data are still to be handled by the first ECS 402 only. The second ECS 406 does not participate.

Additionally, before M/T 404 can start, a replication queue between the first storage device 202 and the second storage device 204 should be drained because only one old storage can be used as the source of data. This can cause a disruption of service.

Further, there is no guarantee all legacy data from both old storages (e.g., the first storage device 202 and the second storage device 204) will be migrated/transformed 404. Indeed, the fact that two storages are connected with replication does not mean content of the storages is fully in synchronization. Due to this, in some situations users request proof that no data was left behind. As illustrated in FIG. 4, during migration/transformation 404, content of the second storage device 204 is not enumerated.

To overcome the above challenges, the disclosed aspects can provide migration and transformation that can support storages in a replicated environment, as well as overcome the above noted challenges.

Figure 5:
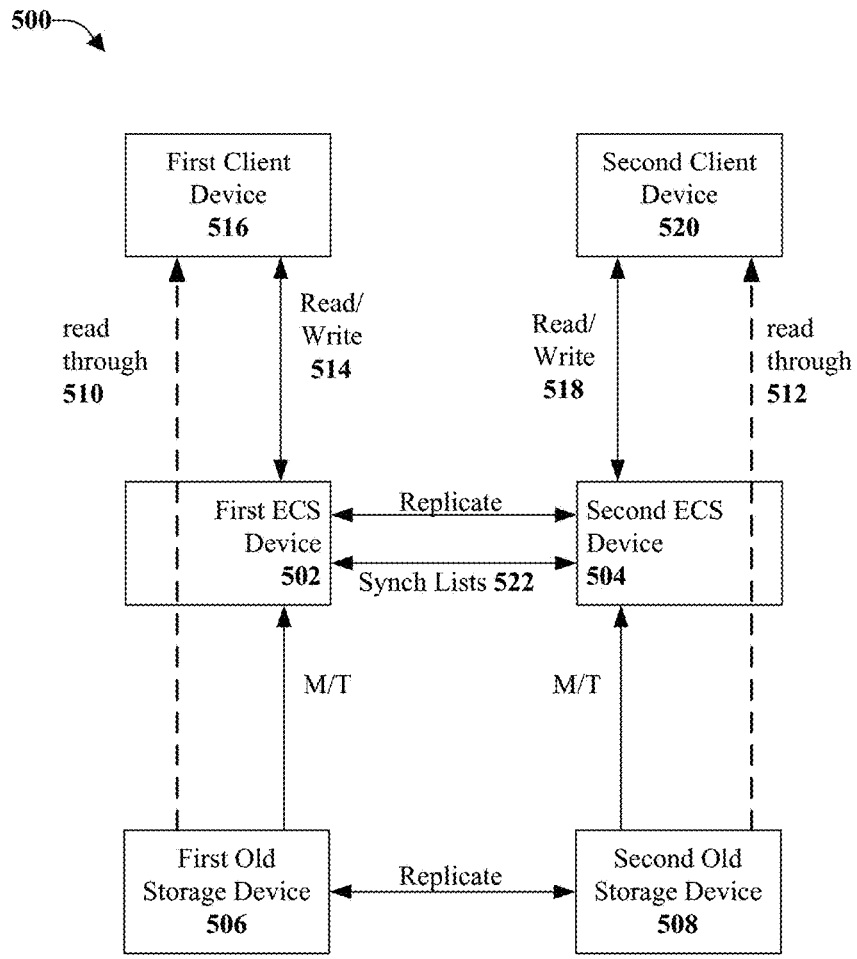
FIG. 5 illustrates an example, non-limiting, system for migration and transformation for storages that operate in a replicated environment in accordance with one or more embodiments described herein.

FIG. 5 illustrates an example, non-limiting, system 500 for migration and transformation for storages that operate in a replicated environment in accordance with one or more embodiments described herein. The system 500 can be configured to utilize all storage devices (both old and new) to play an active role during migration/transformation.

A new migration/transformation task is created and configured before it can start. In particular, as disclosed herein, the new storages (e.g., the first ECS device 502 and the second ECS device 504) can be mapped to a corresponding old storage (e.g., the first old storage device 506 (e.g., the third storage device 122 of FIG. 1) and the second old storage device 508 (e.g., the fourth storage device 124 of FIG. 1). In the example of FIG. 5, the first ECS device 502 can be mapped to the old storage from the same location, which can be the first old storage device 506 (e.g., the first storage device 116 of FIG. 1). Further, the second ECS device 504 can be mapped to the old storage from the same location, which can be the second old storage device 508 (e.g., the second storage device 120).

After the migration/transformation task starts, both new storages (e.g., the first ECS device 502 and the second ECS device 504) can provide read through functionality using the local old storages to which they are mapped. Accordingly, the first ECS device 502 can provide read through functionality 510 using the first old storage device 506. The second ECS device 504 can provide read through functionality 512 using the second old storage device 508.

Failover for read through (not illustrated in the figure for simplicity) can be provided with the following chains. In an implementation, failover can proceed from the first ECS device 502 to the second ECS device 504 to the second old storage device 508. In another implementation, failover can proceed from the second ECS device 504 to the first ECS device 502 to the first old storage device 506. The failover mechanism can be utilized for all the reads of legacy data during migration/transformation.

In an example, the storage devices can identify the data stored therein (e.g., via an internal database). Further, at the client side, an application database can be stored in an application server, for example. Accordingly, the client device can identify at least some of the content of the storage system. A client device can request an object, which can be referred to with object ID. For example, a first client device 516 can request an object from the first ECS device 502, and, by default the first ECS device 502 can access the first old storage device 506 with the object ID and attempt to read from the old storage device and return the object to the first client device 516. Sometimes, the object is not in the old storage. Therefore, the first ECS device 502 can access the second old storage device 508 and attempt to read the same object with the object ID from the second old storage device 508.

The new writes and reads 514 of new data from the first client device 516 can be handled by the first ECS device 502. In a similar manner, the new writes and reads 518 from the second client device 520 can be handled by the second ECS device 504.

As illustrated in FIG. 5, both new storages (e.g., the first ECS device 502 and the second ECS device 504) drive the migration/transformation. For example, since content of the old storages (e.g., the first old storage device 506 and the second old storage device 508) can be almost identical, thee scope of the migration/transformation can be divided between the new storages. This can be performed using a hash function, which can be applied to an object ID to find a primary location (e.g., a new storage) for the object. The new storage devices manage the objects assigned to it with the hash function. In an example, during migration phase (if any), a new storage can read content of the objects assigned to it from the old storage with which it is cross-referenced. The results of migration/transformation can be shared between the new storage devices (e.g., the first ECS device 502 and the second ECS device 504) via a replication mechanism configured between the new storages. In some implementations, the hash function can be utilized to split a dataset (e.g., the data of an old storage device) into two or more subsets of data, which can be handled independently.

The new storage device can enumerate content of the old storage to which it is cross-referenced and, further, can receive a complete list of legacy objects. The list can also comprise objects assigned to another new storage. According to the disclosed aspects, such objects are not simply filtered out. Instead, the lists of objects found can synchronized between the new storage devices in order to not to miss legacy objects that exist in one old storage only (e.g., see sync lists 522 between the first ECS device 502 and the second ECS device 504 in FIG. 5).

According to the various aspects provided herein, both data clients (e.g., the first client device 516 and the second client device 520) can have similar latencies for reads through. These latencies can be reasonable because the vast majority of reads can be handled locally. Further, with the disclosed aspects, overall throughput of migration/transformation is almost doubled because the process is driven in parallel by two pairs of storages (e.g., the first ECS device 502-the first old storage device 506 pair, and the second ECS device 504-the second old storage device 508 pair).

The symmetry of the system configuration that FIG. 5 illustrates can provide a good load balance between the first ECS device 502 and the second ECS device 504 during migration/transformation. For example, both new storages can handle client I/O and can perform migration/transformation at substantially the same time.

In addition, the hash function can define a primary location for data to be migrated/transformed. Therefore, after completion of migration/transformation, the ECS devices can handle approximately its respective proportion (e.g., about one half in the implementation of FIG. 5) of all reads of legacy data. Further, since the new storages synchronize object lists during migration/transformation, the process can be started almost immediately without draining replication queue between old storages. Therefore, migration/transformation does not disrupt service.

Further, since the new storages synchronize object lists during migration/transformation, all legacy data from both old storages can be migrated/transformed with a high degree of certainty. For example, the second old storage device 508 is the only storage that contains a particular object, which according to the hash function should be handled by the first ECS device 502. In this situation, the first ECS device 502 can determine the existence of the particular object from the second ECS device 504 via object list synchronization (e.g., sync lists 522). Thus, the first ECS device 502 can read the object content using the read failover path.

Figure 6:
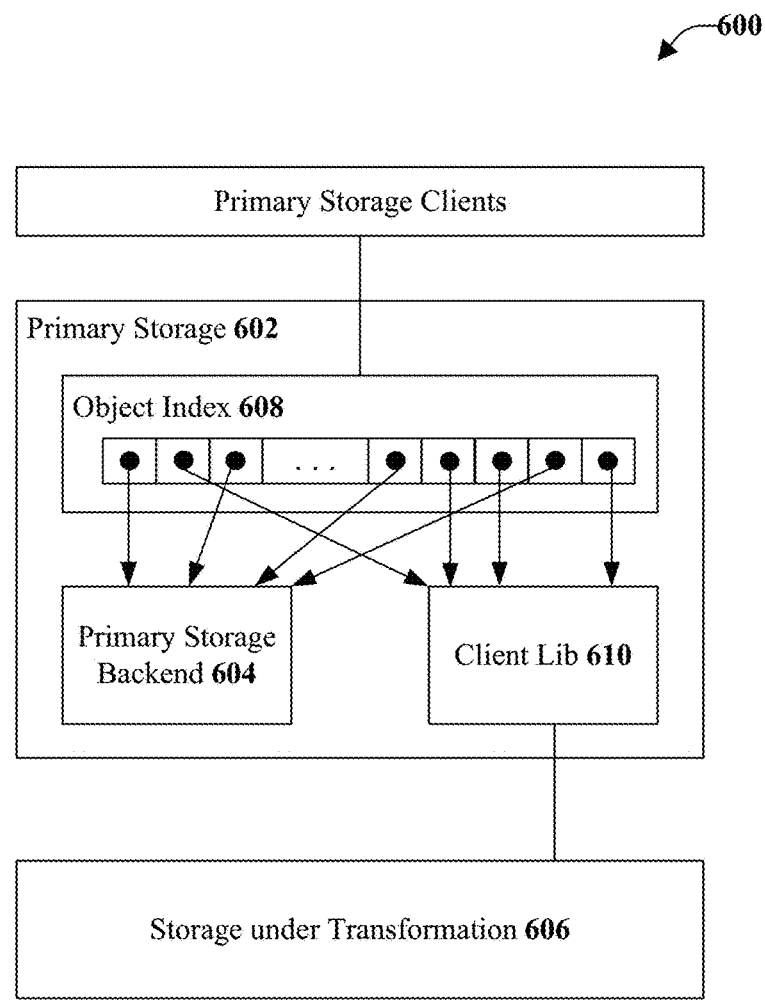
FIG. 6 illustrates an example transformation system.

For purposes of further explaining the disclosed aspects, FIG. 6 illustrates an example transformation system 600. The new storage devices can support one or several existing data storage APIs (content addressed storage API, various cloud storage services various web services, and so on) and can provide some new value-added services. These services can allow the implementation of a new range of solutions for users. Further, users would like new solutions to be applied to all their data, including existing data stored in other storages. This can be performed using migration. However, users are not always ready to write off existing non-legacy storages. In addition, migration is difficult. For example, migration for more or less large storage takes a long amount of time, migration produces high load on both storages, and so on.

Accordingly, transformation has become popular. FIG. 6 illustrates the system state after transformation is completed. The new storage is the primary storage 602 that handles all user traffic. The primary storage 602 can maintain an index of all the objects stored within the transformed system. Some objects can be stored in the storage backend of the primary storage 604. Some objects can reside in the storage under transformation 606. An additional metadata field in the index 608 can indicate an actual location of an object. When an application retrieves an object that belongs to the storage under transformation 606, the primary storage 602 can read the object from the storage under transformation 606 using its client library 610 and can send the object back to the application as if it was stored in the primary storage 602. Therefore, all the objects in the transformed system are equal from an application and value-added services point of view. In particular, applications can access legacy data as if it was migrated and this result can be achieved without an actual data move.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
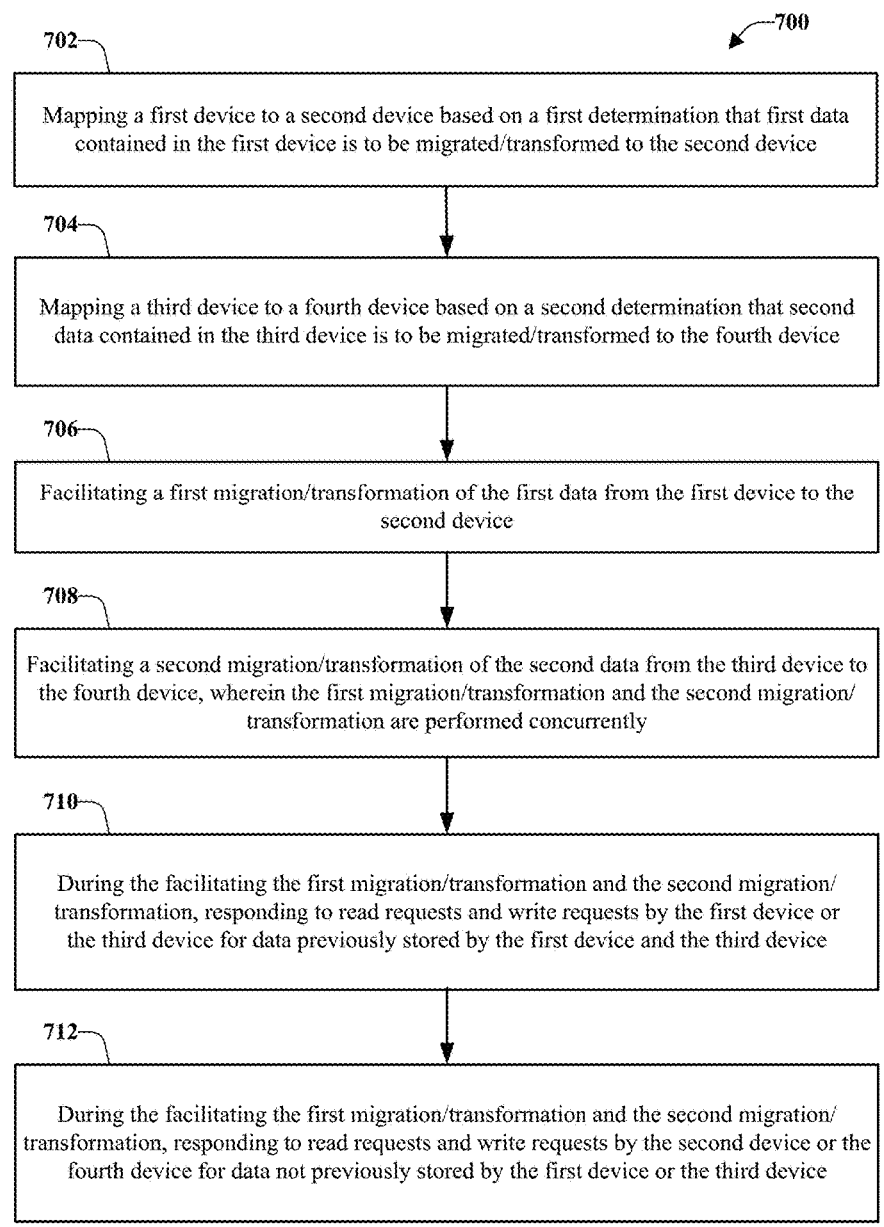
FIG. 7 illustrates an example, non-limiting, method for storage migration/transformation in a replicated environment in accordance with one or more embodiments described herein.

FIG. 7 illustrates an example, non-limiting, method 700 for storage migration/transformation in a replicated environment in accordance with one or more embodiments described herein. Repetitive description of like elements employed in other embodiments described herein is omitted for sake of brevity. The method 700 can be implemented by a system comprising a processor. Alternatively or additionally, a server device and/or a machine-readable storage medium can comprise executable instruction that, when executed by a processor, facilitate performance of operations for the method 700.

At 702, a first device (e.g., the first storage device 116 of FIG. 1, the first old storage device 506 of FIG. 5) can be mapped to a second device (e.g., the third storage device 122 of FIG. 1, the first ECS device 502 of FIG. 5). The mapping can be based on a first determination that first data (e.g., the first data 114 of FIG. 1) contained in the first device is to be migrated to the second device. Further, at 704, a third device (e.g., the second storage device 120 of FIG. 1, the second old storage device 508 of FIG. 5) can be mapped to a fourth device (e.g., the fourth storage device 124 of FIG. 1, the second ECS device 504 of FIG. 5). The mapping can based on a second determination that second data (e.g., the second data 118 of FIG. 1) contained in the third device is to be migrated to the fourth device. The first device and the third device can be old storage devices, and the second device and the fourth device can be new storage devices. Further, at least two of the devices can be connected with replication. For example, the first device and the third device can be connected by replication. Further, the second device and the fourth device can be connected by replication.

A first migration of the first data from the first device to the second device can be facilitated, at 706. In addition, at 708, a second migration of the second data from the third device to the fourth device can be facilitated. The first migration and the second migration can be performed concurrently. During the migration/transformation, read/write requests for existing data can be read through the second device and the fourth device (e.g., processed directly by the first device or the third device as a function of the device that originated the request.). Accordingly, during the facilitating the first migration/transformation and the second migration/transformation, the method 700 can comprise, at 710, responding to read requests and write requests by the first device or the third device for data previously stored by the first device and the third device.

In an example, during the parallel migration, first data can be read from the first device in response to a request for the first data (e.g., from a first client device). Reading the first data can comprise reading the first data via the second device (e.g., read through the second device). In another example, during the parallel migration, second data can be read from the third storage device in response to another request for the second data (e.g., from a second client device). Reading the second data can comprise reading the second data via the fourth device (e.g., read through the fourth device).

Alternatively or additionally, read/write requests for new data can be handled by the second device or the fourth device as a function of the device that originated the request. Accordingly, the method 700 can comprise, during the facilitating the first migration/transformation and the second migration/transformation, responding to read requests and write requests by the second device or the fourth device for data not previously stored by the first device or the third device, at 712.

In an example, a first write request can be received from a first entity. Based on the first write request, the method can comprise instructing the first write request to be processed by the second device, wherein the first write request is for data not previously received (e.g., not contained in the first device). Further, the first device is not accessed during a time period when the first write request is being processed.

In another example, a first request can be received from a first client device. Based on the request, the method can comprise instructing the first read request to be processed by the second device, wherein the first read request is for reading of new data not previously stored (e.g., in the first device). Further, the first device is not accessed during a time period when the first read request is being processed.

Figure 8:
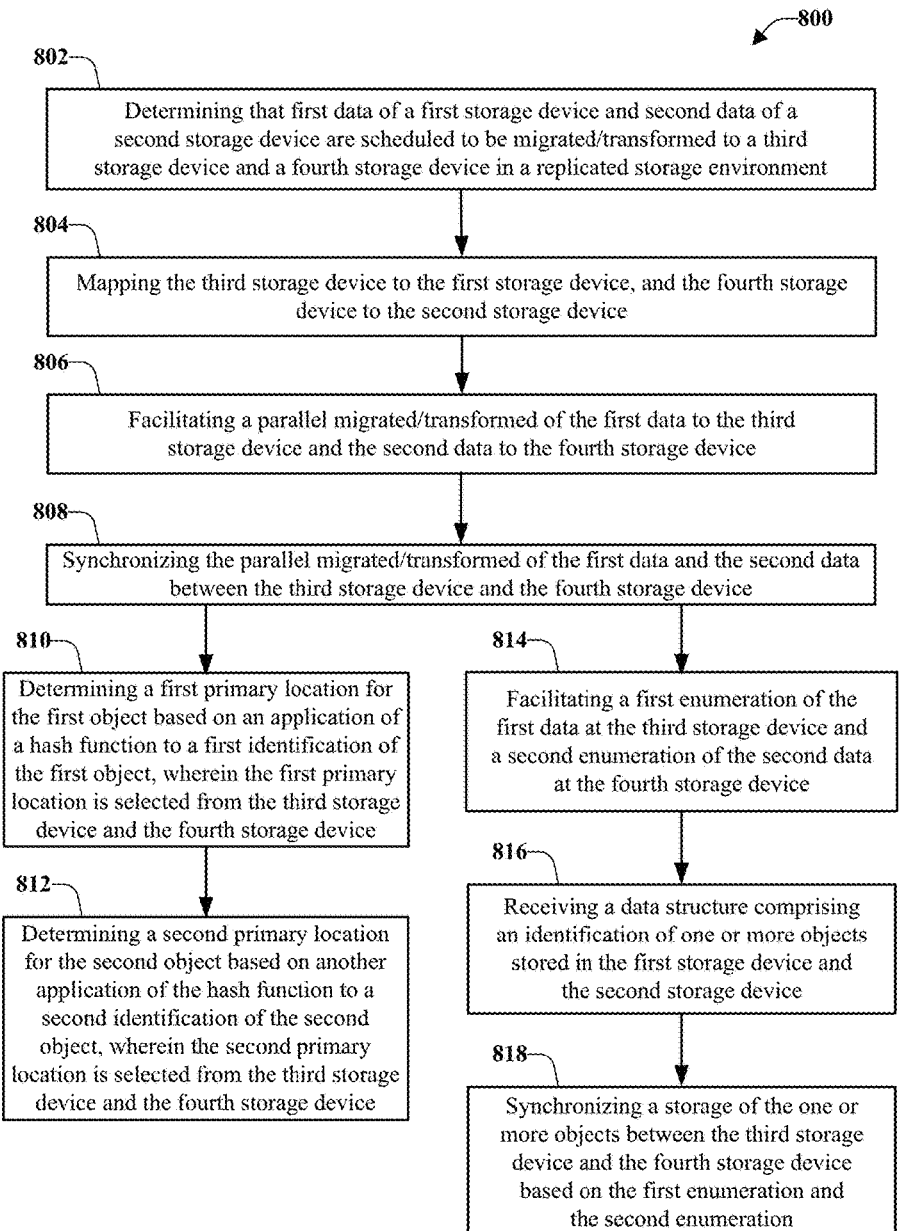
FIG. 8 illustrates an example, non-limiting, method for storage migration/transformation synchronization in a replicated environment in accordance with one or more embodiments described herein.

FIG. 8 illustrates an example, non-limiting, method 800 for storage migration/transformation synchronization in a replicated environment in accordance with one or more embodiments described herein. Repetitive description of like elements employed in other embodiments described herein is omitted for sake of brevity. The method 800 can be implemented by a system comprising a processor. Alternatively or additionally, a server device and/or a machine-readable storage medium can comprise executable instruction that, when executed by a processor, facilitate performance of operations for the method 800.

At 802, a determination is made that first data of a first storage device and second data of a second storage device are scheduled to be migrated to a third storage device and a fourth storage device in a replicated storage environment. The first storage device can be the first storage device 116 of FIG. 1 or the first old storage device 506 of FIG. 5. The second storage device can be the second storage device 120 of FIG. 1 or the second old storage device 508 of FIG. 5. The first data can be the first data 114 of FIG. 4; the second data can be the second data 118 of FIG. 1. Further, the third storage device can be the third storage device 122 of FIG. 1 or the first ECS device 502 of FIG. 5. The fourth storage device can be the fourth storage device 124 of FIG. 1 or the second ECS device 504 of FIG. 5.

The determination of the migration/transformation can comprise creating and configuring the storage migration/transformation based on an indication that a new storage device is intended to replace an existing storage device. At 804, the third storage device can be mapped to the first storage device, and the fourth storage device can be mapped to the second storage device. The method 800 can continue at 806, with facilitating a parallel migration/transformation of the first data to the third storage device and the second data to the fourth storage device.

At 808, the parallel migration/transformation of the first data and the second data can be synchronized between the third storage device and the fourth storage device. According to an implementation, the first data comprises a first object and the second data comprises a second object. Further to this implementation, the method 800 can comprise determining, at 810, a first primary location for the first object based on an application of a hash function to a first identification of the first object. The first primary location can be selected from the third storage device and the fourth storage device. The method 800 can also comprise determining a second primary location for the second object based on another application of the hash function to a second identification of the second object. The second primary location can be selected from the third storage device and the fourth storage device. Thus, the results can be shared between the third storage device and the fourth storage device such that legacy objects that exist in only one of the first storage device or the second storage device are included during the storage migration/transformation.

In an alternative or additional implementation, the method 800 can comprise facilitating, at 814, a first enumeration of the first data at the third storage device and a second enumeration of the second data at the fourth storage device. Further to this implementation, at 816, a data structure comprising an identification of one or more objects stored in the first storage device and the second storage device can be received. A storage of the one or more objects can be synchronized between the third storage device and the fourth storage device, at 818, based on the first enumeration and the second enumeration.

Figure 9:
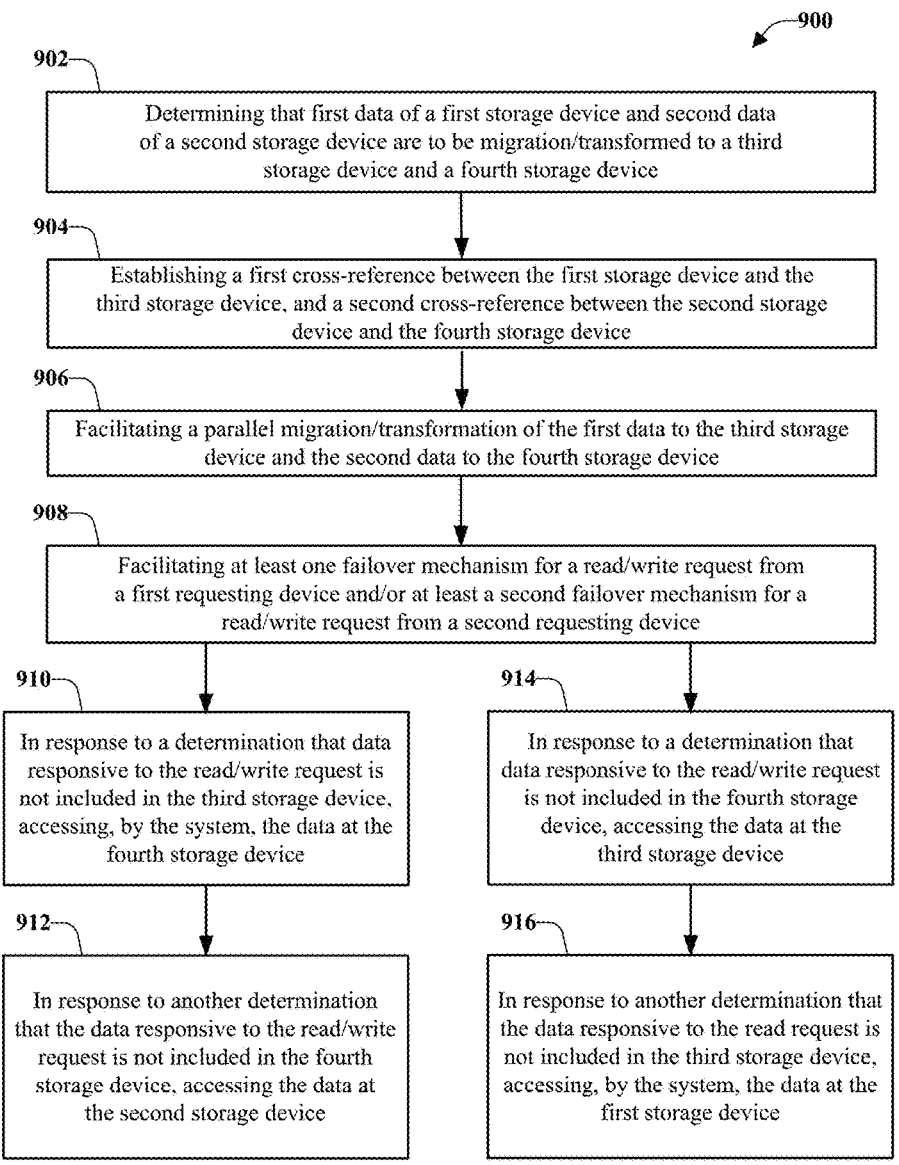
FIG. 9 illustrates an example, non-limiting, method for failover during storage migration/transformation in a replicated environment in accordance with one or more embodiments described herein.

FIG. 9 illustrates an example, non-limiting, method 900 for failover during storage migration/transformation in a replicated environment in accordance with one or more embodiments described herein. Repetitive description of like elements employed in other embodiments described herein is omitted for sake of brevity. The method 900 can be implemented by a system comprising a processor. Alternatively or additionally, a server device and/or a machine-readable storage medium can comprise executable instruction that, when executed by a processor, facilitate performance of operations for the method 900.

At 902, a determination that first data of a first storage device and second data of a second storage device are to be migration/transformed to a third storage device and a fourth storage device. The first storage device can be the first storage device 116 of FIG. 1 or the first old storage device 506 of FIG. 5. The second storage device can be the second storage device 120 of FIG. 1 or the second old storage device 508 of FIG. 5. The first data can be the first data 114 of FIG. 4; the second data can be the second data 118 of FIG. 1. Further, the third storage device can be the third storage device 122 of FIG. 1 or the first ECS device 502 of FIG. 5. The fourth storage device can be the fourth storage device 124 of FIG. 1 or the second ECS device 504 of FIG. 5.

At 904, establishment of a first cross-reference between the first storage device and the third storage device, and a second cross-reference between the second storage device and the fourth storage device can be performed. Facilitation of a parallel migration/transformation of the first data to the third storage device and the second data to the fourth storage device can be performed, at 906.

During the parallel migration/transformation, the method 900 can comprise facilitating, at 908, at least one failover mechanism for a read/write request from a first requesting device and/or at least a second failover mechanism for a read/write request from a second requesting device. For example, the first requesting device can be the first client device 516 of FIG. 5 and the second requesting device can be the second client device 520 of FIG. 5.

According to an implementation, in response to a determination that data responsive to the read/write request is not included in the third storage device, the method 900 can comprise accessing, at 910, the data at the fourth storage device. Further, to this implementation, in response to another determination that the data responsive to the read/ write request is not included in the fourth storage device, the method 900 can comprise, at 912, accessing the data at the second storage device.

In an alternative and/or additional implementation, the method 900 can comprise, at 914, in response to a determination that data responsive to the read/write request is not included in the fourth storage device, accessing the data at the third storage device. Further, in response to another determination that the data responsive to the read/write request is not included in the third storage device, at 916, the data can be accessed at the first storage device In order to provide a context for the various aspects of the disclosed subject matter, FIG. 10 as well as the following discussion are intended to provide a brief, general description of a suitable environment in which the various aspects of the disclosed subject matter can be implemented.

Figure 10:
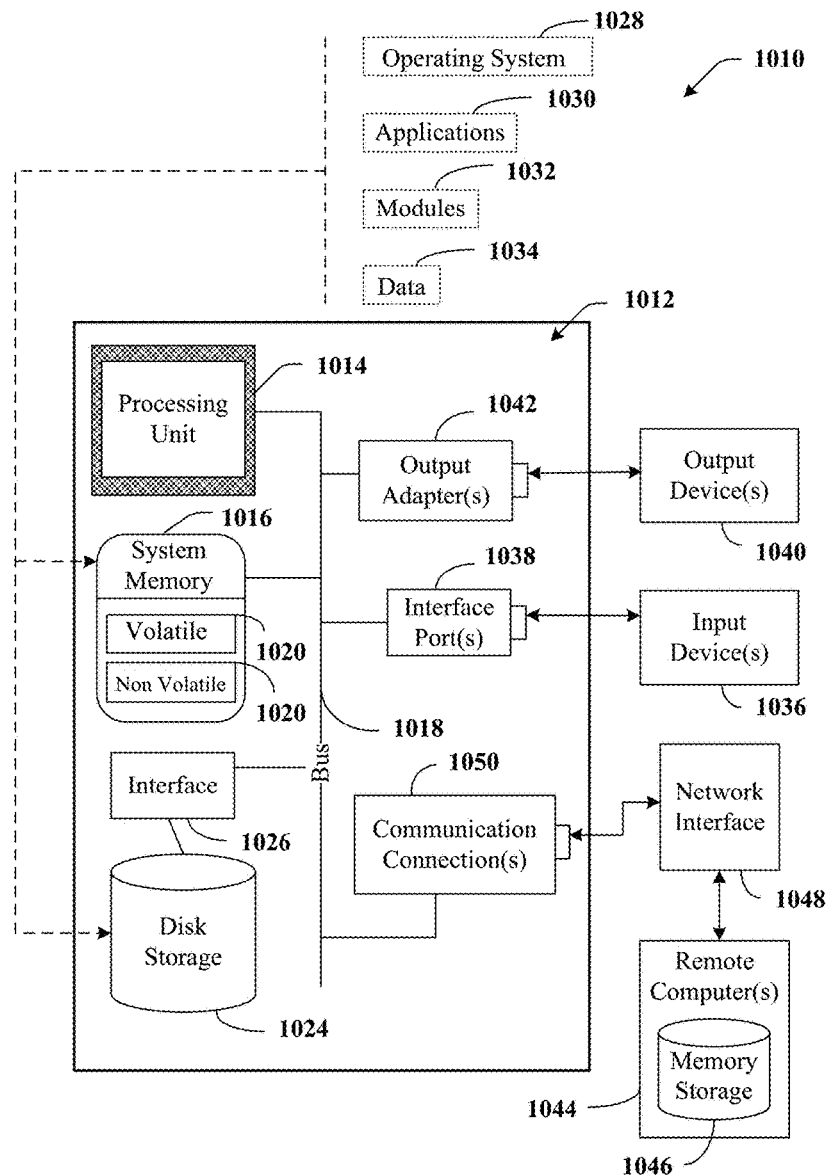
FIG. 10 illustrates an example, non-limiting, computing environment in which one or more embodiments described herein can be facilitated.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, that first data of a first storage device and second data of a second storage device are scheduled to be migrated to a third storage device and a fourth storage device in a replicated storage environment;
   mapping, by the system, the third storage device to the first storage device, and the fourth storage device to the second storage device;
   facilitating, by the system, a parallel migration of the first data to the third storage device and the second data to the fourth storage device;
   receiving, by the system, a data structure comprising an identification of one or more objects stored in the first storage device and the second storage device; and
   synchronizing, by the system, a storage of the one or more objects between the third storage device and the fourth storage device based on a first enumeration of the first data and a second enumeration of the second data.

2. The method of claim 1, further comprising:
   during the parallel migration, facilitating, by the system, reading of the first data from the first storage device in response to a request for the first data, wherein the reading the first data comprises reading the first data via the third storage device.

3. The method of claim 2, further comprising:
   during the parallel migration, facilitating, by the system, reading of the second data from the second storage device in response to another request for the second data, wherein the reading the second data comprises reading the second data via the fourth storage device.

4. The method of claim 1, further comprising:
   receiving, by the system, a first write request from a first client device; and
   instructing, by the system, the first write request to be processed by the third storage device, wherein the first write request is for data not previously received, and wherein the first storage device is not accessed during a time period when the first write request is being processed.

5. The method of claim 1, further comprising:
   receiving, by the system, a first read request from a first client device; and
   instructing, by the system, the first read request to be processed by the third storage device, wherein the first read request is for reading of new data, and wherein the first storage device is not accessed during a time period when the first read request is being processed.

6. The method of claim 1, further comprising:
   synchronizing, by the system, the parallel migration of the first data and the second data between the third storage device and the fourth storage device.

7. The method of claim 1, wherein the first data comprises a first object and the second data comprises a second object, and wherein the method further comprises:
   determining, by the system, a first primary location for the first object based on an application of a hash function to a first identification of the first object, wherein the first primary location is selected from the third storage device and the fourth storage device; and
   determining, by the system, a second primary location for the second object based on another application of the hash function to a second identification of the second object, wherein the second primary location is selected from the third storage device and the fourth storage device.

8. The method of claim 1, further comprising:
   facilitating, by the system, the first enumeration of the first data at the third storage device and the second enumeration of the second data at the fourth storage device.

9. The method of claim 1, further comprising:
   facilitating, by the system, a first replication of the first data and the second data between the first storage device and the second storage device; and
   facilitating, by the system, a second replication of the first data and the second data between the third storage device and the fourth storage device.

10. The method of claim 1, wherein the replicated storage environment is an environment where two or more storage devices are connected with replication.

11. The method of claim 1, further comprising:
    facilitating, by the system, at least one failover mechanism for a read request from a first requesting device.

12. The method of claim 11, further comprising:
    in response to a determination that data responsive to the read request is not included in the third storage device, accessing, by the system, the data at the fourth storage device; and
    in response to another determination that the data responsive to the read request is not included in the fourth storage device, accessing, by the system, the data at the second storage device.

13. The method of claim 11, further comprising:
    in response to a determination that data responsive to the read request is not included in the fourth storage device, accessing, by the system, the data at the third storage device; and
    in response to another determination that the data responsive to the read request is not included in the third storage device, accessing, by the system, the data at the first storage device.

14. A system, comprising:
    a processor; and
    a memory that stores executable instructions that, when executed by the processor, facilitate performance of operations, comprising:
      initiating a transformation of first data from a first group of data storage devices to a second group of data storage devices and second data from a third group of data storage devices to a fourth group of data storage devices, wherein a first data replication is established between first data storage devices in the first group of data storage devices and second data storage devices in the second group of data storage devices, and wherein a second data replication is established between third data storage devices in the third group of data storage devices and fourth data storage devices in the fourth group of data storage devices;
      mapping the first data storage devices in the first group of data storage devices to the second data storage devices in the second group of data storage devices, and the third data storage devices in the third group of data storage devices to the fourth data storage devices in the fourth group of data storage devices; and
      facilitating a parallel transformation of the first data from the first group of data storage devices to the second group of data storage devices, and the second data from the third group of data storage devices to the fourth group of data storage devices;

receiving a data structure comprising an identification of one or more objects stored in the first data storage devices and the third data storage devices; and synchronizing a storage of the one or more objects between the second data storage devices and the fourth data storage devices based on a first enumeration of the first data and a second enumeration of the second data.

15. The system of claim 14, wherein the operations further comprise:

during the facilitating the parallel transformation of the first data, responding to read requests and write requests by the first group of data storage devices for data previously stored by the first group of data storage devices.

16. The system of claim 15, wherein the operations further comprise:

responding to read requests and write requests by the second group of data storage devices for data not previously stored by the first group of data storage devices.

17. A computer-readable storage medium comprising instructions that, in response to execution, cause a system comprising a processor to perform operations, comprising:

mapping a first device to a second device based on a first determination that first data contained in the first device is to be migrated to the second device;

mapping a third device to a fourth device based on a second determination that second data contained in the third device is to be migrated to the fourth device;

facilitating a first migration of the first data from the first device to the second device; and facilitating a second migration of the second data from the third device to the fourth device, wherein the first migration and the second migration are performed concurrently;

receiving a data structure comprising an identification of one or more objects stored in the first device and the third device; and synchronizing a storage of the one or more objects between the second device and the fourth device based on a first enumeration of the first data and a second enumeration of the second data.

18. The computer-readable storage medium of claim 17, wherein the operations further comprise:

during the first migration and the second migration, facilitating reading of the first data from the first device in response to a request for the first data, and wherein the reading the first data comprises reading the first data via the second device.

19. The computer-readable storage medium of claim 17, wherein the operations further comprise:

receiving a read request or a write request for data not retained by the first device and the third device; and utilizing the second device or the fourth device to respond to the read request or the write request.

20. The computer-readable storage medium of claim 17, wherein the first data comprises a first object and the second data comprises a second object, and wherein the operations further comprise:

determining a first primary location for the first object based on a first application of a hash function to a first identification of the first object, wherein the first primary location is selected from the second device and the fourth device; and determining, by the system, a second primary location for the second object based on a second application of the hash function to a second identification of the second object, wherein the second primary location is selected from the second device and the fourth device.

* * * * *